US009262000B2

(12) United States Patent
Kambhatla et al.

(10) Patent No.: US 9,262,000 B2
(45) Date of Patent: Feb. 16, 2016

(54) MULTI-TOUCH INTERFACE SCHEMES

(75) Inventors: Srikanth Kambhatla, Portland, OR (US); Steven B. Mcgowan, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 110 days.

(21) Appl. No.: 13/977,377

(22) PCT Filed: Dec. 16, 2011

(86) PCT No.: PCT/US2011/065447
§ 371 (c)(1),
(2), (4) Date: Sep. 23, 2013

(87) PCT Pub. No.: WO2013/062602
PCT Pub. Date: May 2, 2013

(65) Prior Publication Data
US 2014/0002399 A1    Jan. 2, 2014

Related U.S. Application Data

(60) Provisional application No. 61/551,712, filed on Oct. 26, 2011.

(51) Int. Cl.
G06F 3/041    (2006.01)
G09G 5/00    (2006.01)

(52) U.S. Cl.
CPC ............ *G06F 3/0412* (2013.01); *G06F 3/0416* (2013.01); *G09G 5/006* (2013.01)

(58) Field of Classification Search
None
See application file for complete search history.

(56) References Cited

U.S. PATENT DOCUMENTS

| 7,747,961 | B2 | 6/2010 | Watanabe et al. |
| 7,782,309 | B2 | 8/2010 | Janik |
| 7,928,963 | B2 | 4/2011 | Chang et al. |
| 7,928,964 | B2 | 4/2011 | Kolmykov-zotov et al. |
| 8,009,147 | B2 | 8/2011 | Chang et al. |
| 2003/0058265 | A1 | 3/2003 | Robinson et al. |
| 2008/0180412 | A1* | 7/2008 | Tsang ............................ 345/179 |

(Continued)

FOREIGN PATENT DOCUMENTS

| JP | H03-010363 B2 | 2/1991 |
| JP | H06-44000 A | 6/1994 |
| JP | 2000259523 A | 9/2000 |

(Continued)

OTHER PUBLICATIONS

International Search Report and Written opinion for PCT Patent Application No. PCT/US2011/065447, mailed on Oct. 29, 2012, 8 Pages.

(Continued)

*Primary Examiner* — Joseph Haley
*Assistant Examiner* — Emily Frank
(74) *Attorney, Agent, or Firm* — Lynch Law Patent Group, P.C.

(57) ABSTRACT

Systems, devices and methods are described including using a Human Interface Device (HID) source device to configure a HID sink device to provide interface data such as multi-touch data. The HID source device may enable a data module in the HID sink device to generate the interface data. After receiving the interface data the HID source device may generate output data and provide the output data to the HID sink device.

19 Claims, 9 Drawing Sheets

(56) References Cited

U.S. PATENT DOCUMENTS

2010/0332373 A1* 12/2010 Crabtree et al. ............... 705/37
2013/0080665 A1* 3/2013 Park et al. ..................... 710/60

FOREIGN PATENT DOCUMENTS

| JP | 2001186146 A | 7/2001 |
| JP | 2009053963 A | 3/2009 |
| JP | 2009094667 A | 4/2009 |
| JP | 2010157820 A | 7/2010 |
| JP | 2011003125 A | 1/2011 |
| JP | 2011188230 A | 9/2011 |
| KR | 10-2009-0019839 A | 2/2009 |
| WO | 2013/062602 A1 | 5/2013 |

OTHER PUBLICATIONS

International Preliminary Report on Patentability and Written Opinion received for PCT Patent Application No. PCT/US2011/065447, mailed on Apr. 29, 2014, 4 pages.
Notice of Preliminary Rejection translation for KR 2014-0089524, mailed Apr. 8, 2015, 2 pages.
Notice of Reasons for Rejection for JP 2014-538775, mailed Aug. 4, 2015, 4 pages.
Explanation of superiority to HDMI of Display Port, PC Watch, [online], Jan. 10, 2008, [searched on Jul. 27, 2015], <URL: http://pc.watch.impress.co.jp/docs/2008/0110/ces15.htm>; 4 pages.

* cited by examiner

MULTI-TOUCH INTERFACE SCHEMES

RELATED APPLICATIONS

This application claims priority to and benefit of U.S. Provisional Patent Application No. 61/551,712, filed on Oct. 26, 2011.

BACKGROUND

Recently developed, display interface schemes, such as the DisplayPort® (DP) display interface protocol or standard (see. e.g., DisplayPort® Version 1.2 (December 2009)), are designed to replace older standards such as Video Graphics Array (VGA) and Digital Video Interface (DVI), and rely on packetized data transmission similar to other data communication protocols such as Ethernet, USB, and PCI Express. For example, DP supports both external (e.g., box-to-box) and internal (e.g., laptop display panel) display connections, and unlike DVI and Low-voltage Differential, Signaling (LVDS) standards where differential pairs transmit pixel data and a clock signal, the DP protocol is based on the transmission of small data packets with an embedded clock. The use of data packets also allows interface standards such as DP to be extensible by permitting additional features to be added without significant changes to the interface itself. Embedded DisplayPort® (eDP) is a companion standard (see, e.g., Embedded DisplayPort® Version 1.3 (February 2011)) to the DP standard and provides a standardized display panel interface for internal connections (e.g., between a graphics processor and a notebook display panel) and is designed to replace the LVDS standard.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
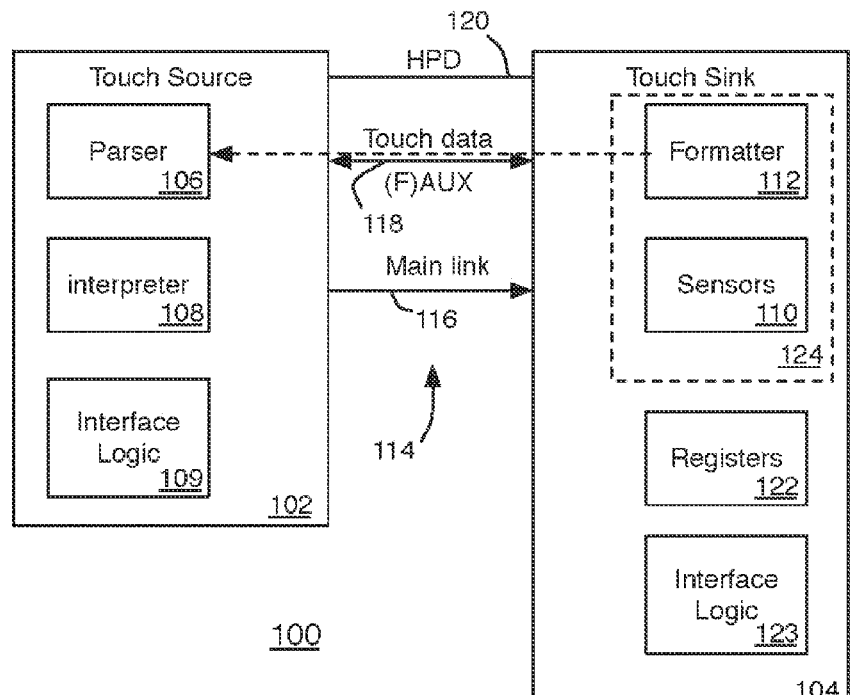
FIGS. 1 and 2 are illustrative diagrams of example display interface systems.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as notebook or desktop computers for example, implementation of the techniques and/or arrangements described herein are not restricted to particular architectures and/or computing systems and may be implemented, by any architecture, and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium, and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

In accordance with the present disclosure, the phrase "Human Interface Device" (HID) as used herein may describe devices used to control the operation of computer systems (e.g., any device consistent with the HID class definition as provided by the Universal Serial Bus Implementers Forum (USB-IF)—see, "Device Class Definition for Human Interface Devices (HID)" Firmware Specification, Version 1.11, published Jun. 27, 2001; hereinafter the "HID 1.11" specification). Further, the phrase "touch data" may be used synonymously with the phrase "multi-touch data" and, as used herein, may refer to data that describes one or more locations where contact with a touch sensitive surface (e.g., a touch screen display) have occurred.

In addition, the phrases "touch sink" and "touch-sink device" may be used synonymously with the term "sink" and the phrase "sink device" and may be used herein to refer to a sink device configured to support the DisplayPort® (DP)

and/or Embedded DisplayPort® (eDP) standards (see, Embedded DisplayPort® Version 1.3, published February 2011) and that is capable of reporting touch data. Further, the phrases "touch source" and "touch source device" may be used synonymously with the term "source" and the phrase "source device" and may be used herein to refer to a source device as defined in the DP 1.2 standard (see, DisplayPort® Version 1.2, published December 2009; hereinafter the "DP 1.2" standard) that is configured to process touch data received, for example, from a touch sink device. In the interest of clarity, the various devices, systems and processes will described herein in the context of the DP and/or eDP standards although the present disclosure is not limited to any particular touch and/or display interface standards, and/or specifications.

While the various systems, devices, schemes and/or processes may be described herein in the context of touch data, the present disclosure is not limited to touch data and/or touch devices. Hence, because information passed between a touch sink, and touch source may be HID compliant, a touch sink may present other types of HID devices, including, but not limited to, a keypad, an alphanumeric display, and so forth. Thus, the various interface schemes and/or processes described herein may be applied to other types of HID devices that may be presented by a touch sink, and may apply to any combination of one or more other types of HID devices with HID touch devices. Further, while the term "interface data" may be used herein to refer largely to touch data, in various implementations, interface data in accordance with the present disclosure may refer to data generated by any type of HID device such as a keypad, an alphanumeric display, and the like.

In various implementations, a touch sink may include touch sensors to generate raw touch data, and a formatter to convert raw touch data into formats as described herein. Further, a touch sink may be configured to transfer touch data to a touch source as described herein. In various implementations, a touch source may have the ability to receive or obtain touch data from a touch sink in addition to being configured, to parse and/or interpret the touch data as described herein. For example, FIG. 1 illustrates a multi-touch display interface system 100 in accordance with the present disclosure including a touch source 102 communicatively coupled to a touch sink 104. An example format in which touch data may be transmitted between touch sink 104 and touch source 102, and various mechanisms by which the transfer of such data may be effected will be described in greater detail below.

In various embodiments, touch source 102 may be configured to implement the DP 1.2 standard and may include a microprocessor such as a graphics processing unit (GPU), Digital Signal Processor (DSP), or the like, configured to parse and interpret interface data such as touch data using a parser module 106 and an interpreter module 108, respectively. Touch source 102 may also include interface logic 109 to implement various schemes or processes to be described herein. For example, interface logic 109 may include logic configured to implement data transfer processes or portions thereof to be described in greater detail below.

In various embodiments, touch sink 104 may include a multi-touch capable display (not shown) configured to capture interface data in the form of multi-touch data and to format the touch data using touch sensors 110 and a formatter module 112, respectively. In various implementations, touch sensors 110 may be any type of known touch sensors, such as capacitive touch sensors, that enable touch sink 104 to capture multi-touch data. Touch sink 104 may also include interface logic 123 to implement various schemes or processes to be described herein. For example, interface logic 123 may include logic configured to implement data transfer processes or portions thereof to be described in greater detail below.

In various implementations, touch sink 104 may be incorporated into a mobile communications device (e.g., smart phone), mobile computer, tablet computer, or the like. In various embodiments, the components of system 100 may be implemented within, a single device such as a mobile communications device, tablet computer, or the like, where touch sink 104 may correspond to one or more logic and/or hardware module(s) associated with a touch screen display, and touch source 102 may include a microprocessor communicatively coupled to the logic and/or hardware module(s) of touch sink 104.

As shown in FIG. 1, system 100 includes a DP link 114 communicatively coupling touch source 102 to touch sink 104 and including a main link 116, an auxiliary or fast-auxiliary channel (F)AUX 118, and a Hot Plug Detect (HPD) signal line 120. In various implementations, main link 116 may be a uni-directional, high-bandwidth, and low-latency channel used for the transport of isochronous streams such as uncompressed video and/or audio data from touch source 102 to touch sink 104. In various implementations, (F)AUX channel 118 may be a half-duplex bidirectional channel used for link management and device control using schemes in accordance with the present disclosure. For example, in various implementations, touch source 102 and touch sink 104 may be designated as master and slave, respectively. In general, transactions over (F)AUX channel 118 are initiated by touch source 102. However, in various implementations, touch sink 104 may prompt the initiation of (F)AUX channel transactions by, for example, sending an interrupt (IRQ) to touch source 102 over signal line 120.

Figure 2:
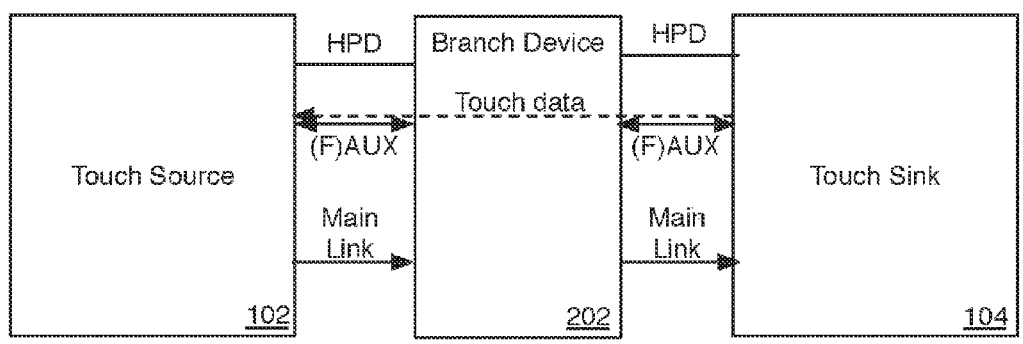

In various implementations, multi-touch display interface systems and/or schemes in accordance with the present disclosure may include one or more intervening devices and/or systems communicatively coupling a touch sink with a touch source. For example, FIG. 2 illustrates a multi-touch display interface system 200 in accordance with the present disclosure including an intervening branch device 202 communicatively coupling touch source 104 to touch sink 102. In various implementations, branch device 202 may be a device configured in accordance with the DP 1.2 standard and may implement sideband messages as described in greater detail below. Further, in various implementations, a branch device may process downstream signals (such as interrupts appearing on signal line 120) within specific time limits based on the rate at which touch sink 102 generates touch data. For example, branch device 202 may need to process interrupts within 20 msec to support a minimum touch data sample rate of 50 Hz.

Returning to the discussion of FIG. 1, in various implementations, and as will be described in greater detail below, touch source 102 may obtain interface data such as touch data from touch sink 104 over (F)AUX channel 118 where the touch data may be in a Human Interface Device (HID) format as defined by an HID Report Descriptor (see, Device Glass Definition for Human Interface Devices (HID) Firmware Specification, Version 1.11, published Jun. 27, 2001; hereinafter, the "HID 1.11 specification"). Further, in accordance with the present disclosure, touch sink 104 may conform to touch-related format requirements as set forth in the multi-touch extensions for digitizers (see, "Addition of usages related to multi-touch digitizers", Request #HUTRR34, published Feb. 27, 2009; hereinafter the "HUTRR34" document) that modify the HID Usage Tables (see, HID Usage Tables, Version 1.12, published Oct. 28, 2004). In addition, touch sink 104 may expose touch capability as a digitizer device in accordance with the HID 1.11 specification. In accordance with the present disclosure, HID information including HID Report Descriptors may be conveyed between touch sink 104 and touch source 102 over (F)AUX channel 118.

In various implementations, and as will be explained in greater detail below, touch sink 104 may include registers 122 that touch sink 104 may use to temporarily store data such as configuration data, touch data and the like, that may be accessed by touch source 102 via (F)AUX channel 118. In various implementations, registers 122 may include DP Configuration Data (DPCD) registers and touch source 102 may have read and write access to those DPCD registers for various purposes as will be explained in greater detail below. Further, in various implementations, as will be explained in greater detail below, a data module 124 (including sensors 110 and formatter module 112) may be configured in response to one or more DPCD registers of registers 122.

In various implementations, touch sink 104 may support a sample rate of at least 50 Hz for touch data. In various implementations, touch sink 104 may convey touch data related interrupts to touch source 102 and touch source 102 may process those interrupts at a rate commensurate with the sample rate of touch sink 104. For example, touch sink 104 may convey IRQ_HPD interrupts to touch source 102 via signal line 120. While the DP 1.2 standard requires source devices to process an IRQ_HPD within 100 msec (corresponding to a sample rate of 10 Hz), in various implementations in accordance with the present disclosure, touch source 102 may process an IRQ_HPDs within 20 msec to support processing of touch data sampled at a rate of 50 Hz by touch sink 104.

In various implementations, system 100 may not support separate device descriptors specifying touch capability. However, in other implementations, touch sink 104 may provide Extended Display Identification Data (EDID), in accordance with the DP 1.2 standard, to indicate that touch sink 104 has touch capability. In addition, touch sink 104 may include vendor information for Plug-and-Play (PnP) purposes. Such EDID and/or vendor information may be stored in memory (not shown) internal to touch sink 104. In addition, in various implementations, touch source 102 may include system software and/or firmware that supports HID Boot Mode operation and HID Descriptor parsing as described herein.

Capability Discovery

In various implementations, touch sink 104 may announce its touch capability through a TOUCH_SUPPORTED bit in a TOUCH_CAPABILITY DPCD register portion of registers 122. Touch source 102 may then read the TOUCH_SUPPORTED bit as part of sink capability discovery triggered by Sink discovery.

In various implementations, touch sink 104 may provide a HID Descriptor and a HID Report Descriptor formatted as described in the HID specifications. These two descriptors (and optionally other HID class descriptors, as allowed in the HID 1.11 specification) may be obtained by touch source 102 from respective HID_CLASS_DESCRIPTORS DPCD register portions of registers 122 after ascertaining touch capability in touch sink 104. In various implementations, class descriptors declared in the HID Descriptor may immediately follow the HID Descriptor in the HID_DESCRIPTORS DPCD registers in the order in which they were declared in the HID Descriptor.

Touch Sink Configuration

In accordance with the present disclosure, touch source 102 may configure touch sink 104 in various ways. For example, Table 1 lists various example commands that touch source 102 may issue to touch sink 104:

TABLE 1

Example Commands

| Command | Description |
|---|---|
| ENABLE_TOUCH_FEATURE | Enable or disable touch feature in a touch sink |
| DATA_ACCESS_METHOD | Configure touch sink for interrupt generation |
| RESET | Reset touch functionality (hardware/firmware) in a touch sink |
| GET_FEATURE_REPORT | Get the feature report for the specified Report ID |
| SET_FEATURE_REPORT | Drive a Feature Report out to a touch sink |
| SET_OUTPUT_REPORT | Drive an Output Report to a touch sink |
| SET_IDLE | Configure rate at which Input Reports are generated in a touch sink |
| SET_LOW_POWER | Put the touch feature in the sink to low power state |

In various implementations, touch sink 104 may acknowledge success or failure in response to the commands of Table 1 via standard DPCD AUX transaction mechanisms as defined in the DP 1.2 standard.

In various implementations, touch source 102 may enable or disable touch features of touch sink 104 by enabling or disabling data module 124. For example, as set forth in Table 1, touch source 102 may disable the data module 124 (and associated data reporting) in touch sink 104 by setting an ENABLE_TOUCH_FEATURE bit in a CONFIGURE_TOUCH DPCD register. Conversely, touch source 102 may enable data module 124 by resetting that bit. For example, touch source 102 may disable data module 124 by writing a zero to the ENABLE_TOUCH_FEATURE bit, and may enable data module 124 by writing a one to that bit.

In various implementations, touch source 102 may configure a method for accessing touch data from touch sink 104. In various implementations, a data access method may be configured to be an interrupt based data access method or a poll based data access method. For example, touch source 102 may configure a poll based data access method by setting a DATA_ACCESS_METHOD bit in a CONFIGURE_TOUCH DPCD register to Polled so that touch related IRQ_HPD interrupt generation by touch sink 104 is disabled. Conversely, touch source 102 may enable an interrupt based data access method by setting the DATA_ACCESS_METHOD bit to Interrupt so that IRQ_HPD interrupt generation by touch sink 104 is enabled.

Continuing the discussion of Table 1, touch source 102 may reset touch functionality in touch sink 104 by setting a RESET bit in a CONFIGURE_TOUCH DPCD register. Touch sink 104 may then bring data module 124 to reset condition in response to this command. In particular, in various implementations, setting a reset condition may disable data module 124, may flush an Input Report queue (to be described later), and may reset a TOUCH_STATUS register in registers 122 to indicate that no report data is available.

In various implementations, touch source 102 may issue a read request for a feature report by writing the Report ID of interest to TOUCH_PARAMETERS[0] DPCD register and by setting the GET_FEATURE_REPORT bit in the CONFIGURE_TOUCH DPCD register to one. In various implementations, touch sink 104 may indicate availability of a feature report to be read in the REPORT_DATA DPCD region at offset 0.

In various implementations, as will be explained in greater detail below, touch source 102 may issue a feature report to touch sink 104. For example, touch source 102 may do so by writing a feature report in a REPORT_DATA DPCD region of registers 122 at a particular offset, and by setting a SET_FEATURE_REPORT bit in a CONFIGURE_TOUCH DPCD register of registers 122.

In addition, in various implementations, as will be explained in greater detail below, touch source 102 may issue an output report to touch sink 104. For example, touch source 102 may do so by writing an output report to an OUTPUT_REPORT DPCD region of registers 122 at a particular offset, and by setting a SET_OUTPUT_REPORT bit in a CONFIGURE_TOUCH DPCD register of registers 122.

Concluding the discussion of Table 1, in various implementations, touch source 102 may set a reporting rate for input reports generated by touch sink 104. For example, touch source 102 may do so by writing the parameters for this command in a IDLE_RATES DPCD region of registers 122, and by setting a SET_IDLE_RATE bit in a CONFIGURE_TOUCH DPCD register of registers 122. In various implementations, the idle rate for each Report ID may be specified in milliseconds according to the following rules: (1) a value of zero indicates the duration is indefinite, as defined in the HID specification (for this value, no interrupts will be generated by touch sink 104 even if touch source 102 programs the DATA_ACCESS_METHOD to Interrupt); (2) values of one through four are not supported; (3) a minimum valid value of the idle rate is 5 milliseconds implying a maximum sample rate of 200 Hz; and (4) given a minimum sample rate of 50 Hz, the maximum scan rate is 20 milliseconds.

Figure 5:
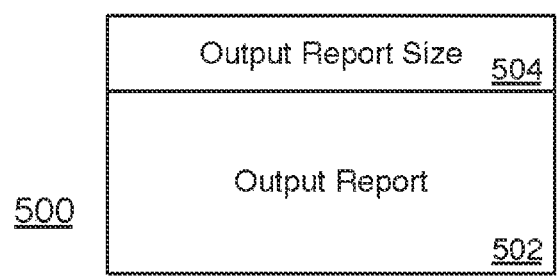

In accordance with the present disclosure, touch source 102 may set data module 124 of touch sink 104 to a sleep (low power) state. For example, touch source 102 may do so by setting a SET_LOW_POWER bit in the CONFIGURE_TOUCH DPCD register. In various implementations, when SET_LOW_POWER has a value of zero, data module 124 may be in an ON state. In various implementations, the SET_LOW_POWER bit may be valid only when touch sink 104 is in an ACTIVE state (such as STATE 1 in FIG. 5-2 of the DP 1.2 standard).

Register Layout and Access Rules

In accordance with the present disclosure, HID_CLASS_DESCRIPTORS DPCD register portions of registers 122 may include an array of HID class descriptors, where the first descriptor may be a HID Descriptor. In various implementations, the layout of an HID Descriptor may conform with section 6.2.1 of the HID 1.11 specification. The HID Descriptor may identify the revision of the HID specification that it supports, and other information specific to the HID device. In addition, the bNumDescriptors field of the HID Descriptor may define the number of additional HID class descriptors that are available. The bNumDescriptors field may be followed by an array of three byte entries, where the first byte of an entry (bDescriptorType) defines the type of the HID class descriptor and the remaining two bytes of an entry (wDescriptorLength) define the size of the HID class descriptor. In various implementations, the assignment of HID class type values may conform to section 7.1 of the HID 1.11 specification.

Figure 3:
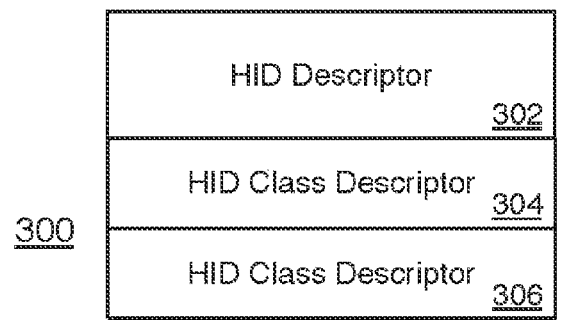
FIGS. 3-5 illustrate example register layouts.

In various implementations, as shown in FIG. 3, HID class descriptors may be packed on byte boundaries within a HID_CLASS_DESCRIPTORS DPCD region layout 300 of registers 122. For instance, an HID descriptor field 302 may start at offset 0 and a first byte (bLength) of HID descriptor 302 may identify the HID descriptor's size in bytes. One or more HID class descriptors may be associated with the HID descriptor. For instance, two example HID class descriptors 304 and 306 are depicted in FIG. 3. In various implementations, HID descriptor 302 may identify a size, number and/or type of HID class descriptors appearing in layout 300. In various implementations, HID class descriptor 304 may start at offset HID Descriptor:bLength, HID class descriptor 306 may start at offset HID Descriptor:bLength+wDescritorLength[0], a third HID class descriptor (not shown) may start at HID Descriptor:bLength+wDescritorLength[0]+wDescritorLength[1], and so on. In various implementations, a HID device may only define one additional HID class descriptor, a Report Descriptor.

Reports

In accordance with the present disclosure, input reports, output reports and feature reports, as will be described in greater detail below, may be provided. In various implementations, touch source 102 may originate output reports and feature reports and touch sink 194 may originate input reports and feature reports. In various implementations, an input report generated by touch sink 104 may contain interface data such as touch data generated by data module 124. In various implementations, an output report generated by touch source 102 may contain output data such as one or more user interface commands generated by touch source 102 in response to touch data provided by an input report. In various implementations, a feature report may identify the mode that a digitizer (e.g., touch sink 104) is operating in and a maximum number of simultaneous contacts/touches that are supported by the interface. For example, FIG. 13, described in greater detail below, depicts an example layout of a feature report in combination with an input report.

In various implementations, it may be mandatory for touch sink 104 to support input reports and touch sink 102 may support feature reports only if they are declared in a corresponding HID Descriptor. In various implementations, it may be mandatory for touch source 102 to be able to parse input reports and feature reports received from touch sink 104, and to generate output reports and feature reports in response. In various implementations, one or more software applications of a touch source 102 may support HID usages as set forth in the HUTRR34 document.

Touch Sink Generated Reports

Figure 4:
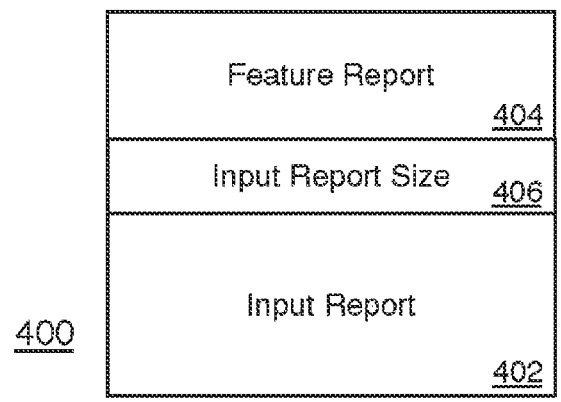

In accordance with the present disclosure, touch sink 104 may store an input report and (when applicable) a feature report that may be accessed by touch source 102. For example, as depicted in FIG. 4, touch sink 104 may do so by storing an input report 402 and corresponding feature report 404 in a REPORT_DATA DPCD region layout 400 of registers 122. In various implementations, if feature report 404 is declared in a corresponding Report Descriptor, then each instance of its Report ID may have a fixed-size. In various implementations, the size of a feature report field of REPORT_DATA DPCD region 400 may be defined by the corresponding HID descriptor and may be the size of the largest Report ID for feature report 404. If the Report Descriptor does not contain a feature report, then feature report 404 may not be present in layout 400. In various implementations, the size of input report 402 may vary based on a number of touch contacts captured by data module 124. The HID Descriptor may identify the size of input report 402 in an Input Report Size area 406 of layout 400. For instance, Input Report Size 406 may identify the number of valid bytes in input report 402. In various implementations, Input Report Size field 406 may have a size of two bytes. Further, the HID Descriptor may identify a maximum size of Input report 402.

Touch Source Generated Reports

In accordance with the present disclosure, touch source 102 may store (when applicable) an output report in registers 122 of touch sink 104. For example, touch source 102 may store an output report 502 in an OUTPUT_REPORT DPCD region that may be structured as shown in layout 500 of FIG. 5. In various implementations, a Report Descriptor may define the maximum size of the Output Report sub-region. In various implementations, the size of output report 502 may vary based on the content that a touch source provides and an Output Report Size field 504 may specify the size of output report 502. In various implementations, Output Report Size field 504 may have a size of two bytes. Further, the HID Descriptor may identify a maximum size of output report 502.

In various implementations, touch source 102 and touch sink 104 may share the Feature Report registers in REPORT_DATA DPCD region 400. In such implementations, touch sources and touch sinks may synchronize access using a FEATURE_DATA_AVAILABLE bit in the TOUCH_STATUS DPCD register as described in greater detail below.

In various implementations, if a Report Descriptor uses Report IDs to define multiple reports of a specific type (e.g., feature, input, or output), then the size of the report sub-region may be the union of the size of all reports defined of the same type. In accordance with the present disclosure, software associated with touch source 102 may determine the maximum size of each report by parsing the Report Descriptor, and the number of valid bytes in the current report by examining the Size field preceding the report sub-region.

Data Transfer

In accordance with the present disclosure, touch sink 104 may transfer touch data to touch source 102. For example, touch source 102 may obtain touch data from touch sink 104 using (F)AUX channel 118. In accordance with the present disclosure, touch source 102 may use various methods to access HID reports such as input reports containing touch data generated by touch sink 104. For instance, as discussed above, touch source 102 may configure touch sink 104 to enable an interrupt based data access method or a poll based data access method for touch data access by touch source 102.

Figure 6:
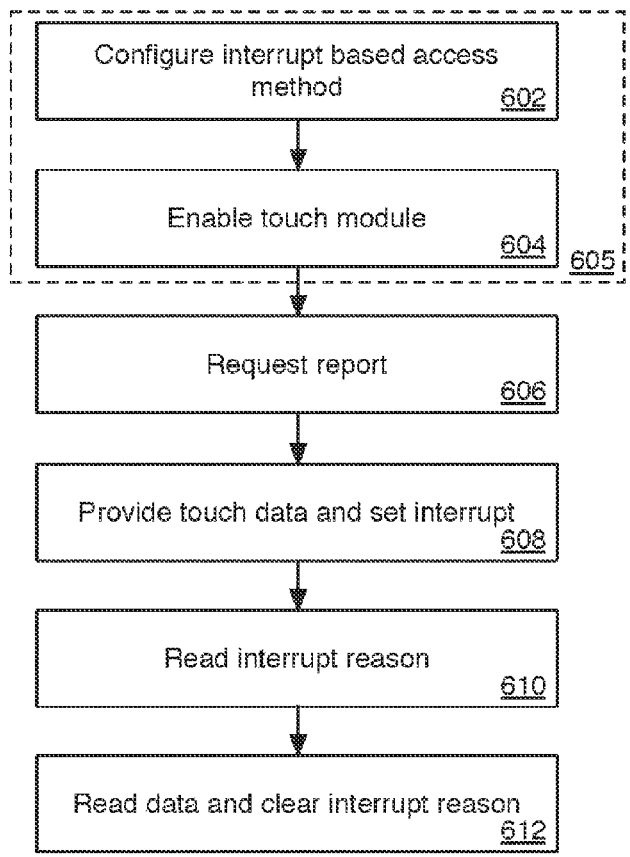
FIGS. 6-12 illustrate example display interface processes.
Figure 7:
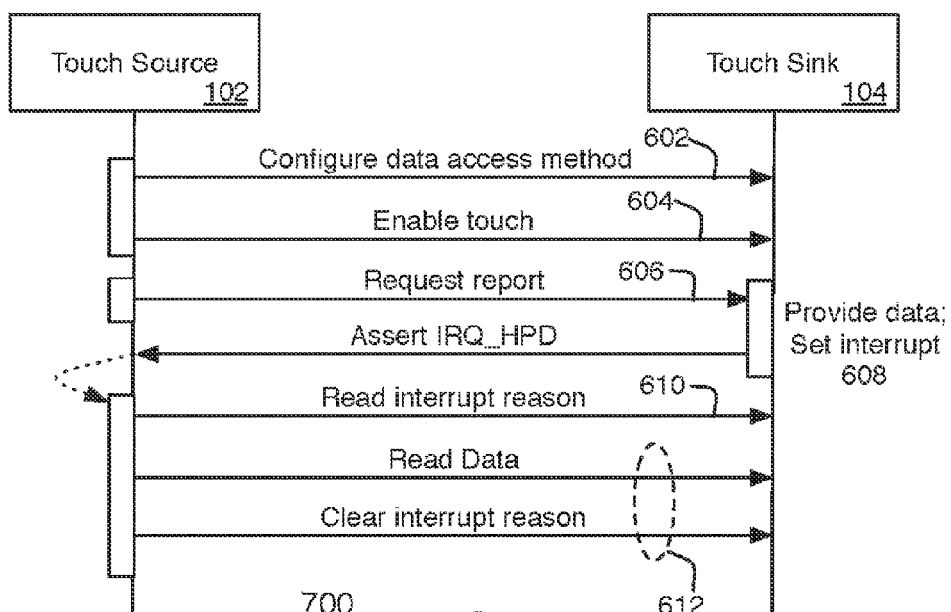

FIG. 6 illustrates a flow diagram of an example process 600 for implementing interrupt based data access by a touch source according to various implementations of the present disclosure. FIG. 7 illustrates an example sequence chart 700 corresponding to process 600. In various implementations, process 600 may be used to access interface data such as touch data stored in DPCD registers of a touch sink. For example, touch source 102 may implement process 600 to read an input report and/or a feature report from registers 122 of touch sink 104. Process 600 may include one or more operations, functions or actions as illustrated by one or more of blocks 602, 604, 606, 608, 610 and 612 of FIG. 6. By way of non-limiting example, process 600 will be described herein with reference to example system 100 of FIG. 1.

Process 600 may begin at block 602 where a touch source may configure an interrupt based access method. For example, touch source 102 may configure touch sink 104 for interrupt based data access by commanding touch sink 104 to generate interrupts using the DATA_ACCESS_METHOD bit in the CONFIGURE_TOUCH DPCD register. At block 604, the touch source may enable a data module in the touch sink. For example, touch source 102 may enable data module 124 by setting the ENABLE_TOUCH bit in the CONFIGURE_TOUCH DPCD register. In various implementations, blocks 602 and 604 may be combined into a single initialization operation 605 that configures a touch sink to provide touch data. For example, touch source 102 may undertake a single write-operation over (F)AUX channel 118 to implement blocks 602 and 604 as operation 605. In various implementations, a touch source may not perform initialization operation 605 during each instance of reading a report via process 600, rather, in such implementations, a touch source may execute the initialization operation only in response to a change in touch sink configuration (e.g., a change in the configuration of system 100).

At block 606, the touch source may request a report. For example, touch source 102 may request a feature report for a particular Report ID by setting TOUCH_PARAMETERS[0] to the desired Report ID and by setting the GET_FEATURE_REPORT bit in the TOUCH_COMMAND DPCD register.

In response to a report request at block 606, the touch sink may provide data and set a corresponding interrupt (block 608). For example, on each instance of the availability of multi-touch data, touch sink 104 may, if the INPUT_REPORT_AVAILABLE bit in the TOUCH_STATUS DPCD register and the TOUCH_INTERRUPT bit are clear, populate the Input Report section of the REPORT_DATA DPCD region with multi-touch data. Touch sink 104 may then set an interrupt to signal the availability of the input report containing the multi-touch data. For example, touch sink 104 may set a reason for the interrupt by setting the INPUT_REPORT_AVAILABLE bit and the TOUCH_INTERRUPT bit in DEVICE_SERVICE_IRQ_VECTOR, and may then assert IRQ_HPD to provide the interrupt to touch source 102.

Further, in various implementations, upon detection of the GET_FEATURE_REPORT bit being set, the touch sink may, at block 608, read the Report ID from TOUCH_PARAMETERS[0], and, if the FEATURE_REPORT_AVAILABLE bit in the TOUCH_STATUS DPCD register and the TOUCH_INTERRUPT bit are clear, may populate the Feature Report for the desired Report ID at REPORT_DATA[0], set the reason for interrupt by setting the FEATURE_REPORT_AVAILABLE bit and the TOUCH_INTERRUPT bit in DEVICE_SERVICE_IRQ_VECTOR, and assert IRQ_HPD.

Process 600 may then continue at block 610 where the touch source may read the interrupt reason. Process 600 may then conclude at block 612 with the touch source may read the data and clear the interrupt reason. For instance, upon detection of IRQ_HPD, touch source 102 may read the DEVICE_SERVICE_IRQ_VECTOR to check if the TOUCH_INTERRUPT bit is set. If the TOUCH_INTERRUPT bit is set, then touch source 102 may read the TOUCH_STATUS DPCD register to determine if either the INPUT_REPORT_AVAILABLE or OUTPUT_REPORT_AVAILABLE bits are set, may read the data (e.g., multi-touch data in the input report) corresponding to the availability indication (e.g., in some cases both input and feature reports may be available and a touch source may read both reports), and may clear the interrupt reason by clearing the availability bit(s) that were processed and clearing the TOUCH_INTERRUPT bit. In various implementations, process 600 may end at block 610 rather than block 612 if touch source 102 determines that both the INPUT_REPORT_AVAILABLE and the OUTPUT_REPORT_AVAILABLE bits are not set.

Figure 8:
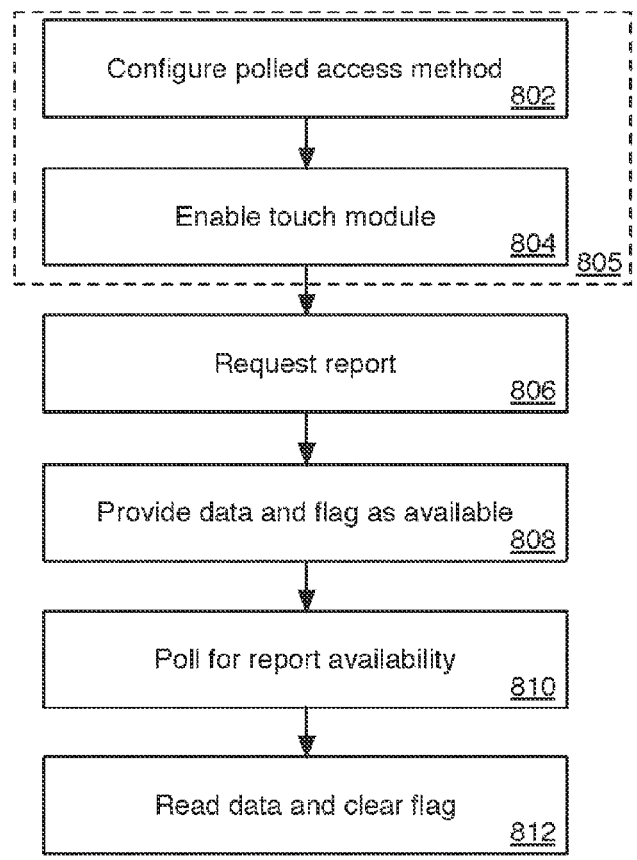
Figure 9:
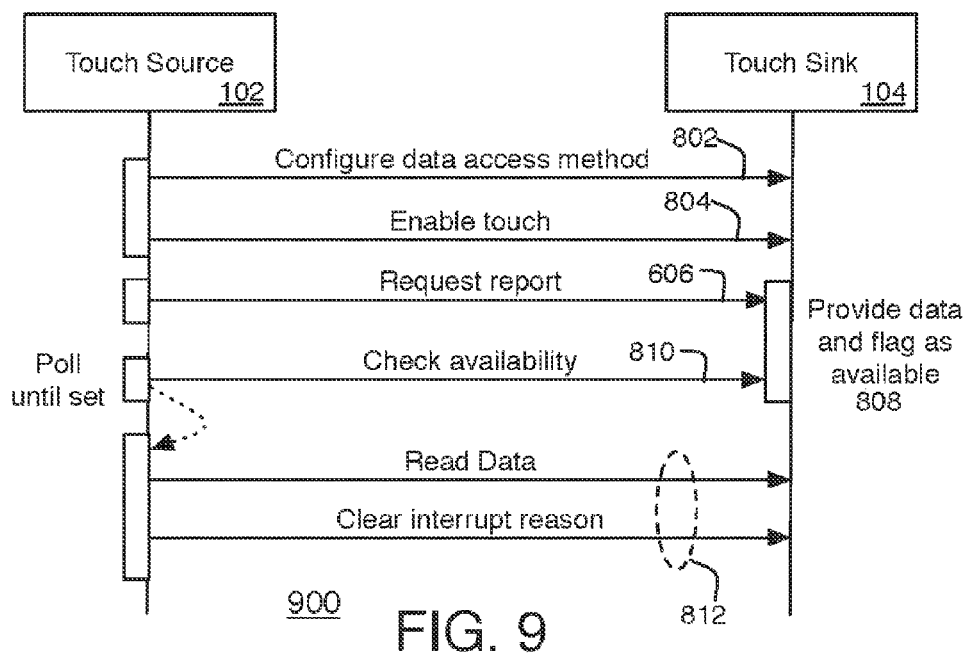

FIG. 8 illustrates a flow diagram of an example process 800 for implementing polled data access by a touch source according to various implementations of the present disclosure. FIG. 9 illustrates an example sequence chart 900 corresponding to process 800. In various implementations, process 800 may be used to access data stored In DPCD registers of a touch sink. For example, touch source 102 may implement process 800 to read an input report and/or a feature report from registers 122 of touch sink 104. Process 800 may include one or more operations, functions or actions as illustrated by one or more of blocks 802, 804, 806, 808, 810 and 812 of FIG. 8. By way of non-limiting example, process 800 will be described herein with reference to example system 100 of FIG. 1.

Process 800 may begin at block 802 where a touch source may configure a touch sink for polled access method. For example, touch source 102 may configure touch sink 104 for polled access by setting the DATA_ACCESS_METHOD bit to Polled in the CONFIGURE_TOUCH DPCD register. At block 804, the touch source may enable a data module in the touch sink. For example, touch source 102 may enable data module 124 by setting the ENABLE_TOUCH bit in the CONFIGURE_TOUCH DPCD register. In various implementations, blocks 802 and 804 may be combined into a single initialization operation 805 that configures a touch sink to provide touch data. For example, touch source 102 may undertake a single write operation over (F)AUX channel 118 to implement operation 805. In various implementations, a touch source may not perform initialization operation 805 on each instance of reading a report via process 800, rather, in such implementations, a touch source may execute operation 805 only in response to a change in current touch sink configuration (e.g., a change in the configuration of system 100).

At block 806, the touch source may request a report. For example, touch source 102 may request a feature report for a particular Report ID by setting TOUCH_PARAMETERS[0] to the desired Report ID and by setting the GET_FEATURE_REPORT bit in the TOUCH_COMMAND DPCD register.

In response to a report request at block 806, the touch sink may provide data and flag the data as being available (block 808). For example, on each instance of the availability of touch data touch sink 104 may, if the INPUT_REPORT_AVAILABLE bit in the TOUCH_STATUS DPCD register and the TOUCH_INTERRUPT bit are clear, populate the Input Report section of the REPORT_DATA DPCD region with touch data. Touch sink 104 may then set a report availability flag (e.g., the INPUT_REPORT_AVAILABLE bit for an Input Report, and FEATURE_REPORT_AVAILABLE bit for a Feature Report). In various implementations, when undertaking block 808, touch sink 104 may set the corresponding availability bits in TOUCH_STATUS but, unlike process 600, may not set the TOUCH_INTERRUPT bit and may not assert an IRQ_HPD signal.

At block 810, the touch source may poll for report availability. For example, touch source 102 may poll for the presence of report availability flags (e.g., by checking the INPUT_REPORT_AVAILABLE bit for an input report, and FEATURE_REPORT_AVAILABLE bit for a feature report) until one or both are set. At block 812, process 800 may conclude when a touch source reads the data and clears the corresponding flag. For example, once touch source 102 determines that one or both input report availability flags is/are set at block 810, block 812 may involve the touch source reading the corresponding report(s) from the REPORT_DATA DPCD registers, and clearing the report availability flag(s) that were found to be set.

In various implementations, a touch source may interleave interrupt based and polled data access methods to minimize latency associated with interrupt notifications by alternately configuring the touch sink as stated above in the descriptions of FIGS. 6 and 8. If interleaved data access is undertaken, a touch source should ensure that it does not lose data during the switch between the access methods.

Figure 10:
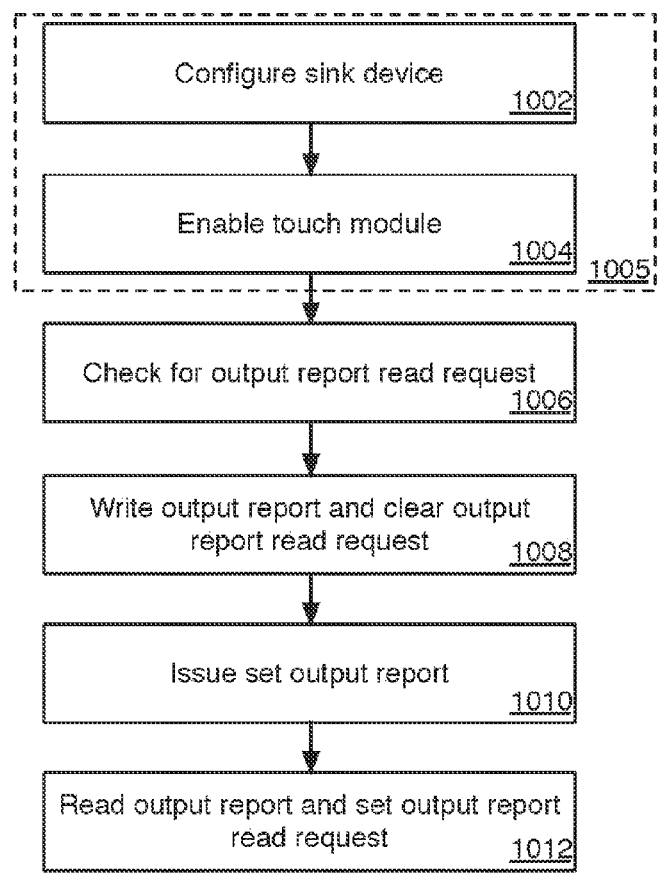
Figure 11:
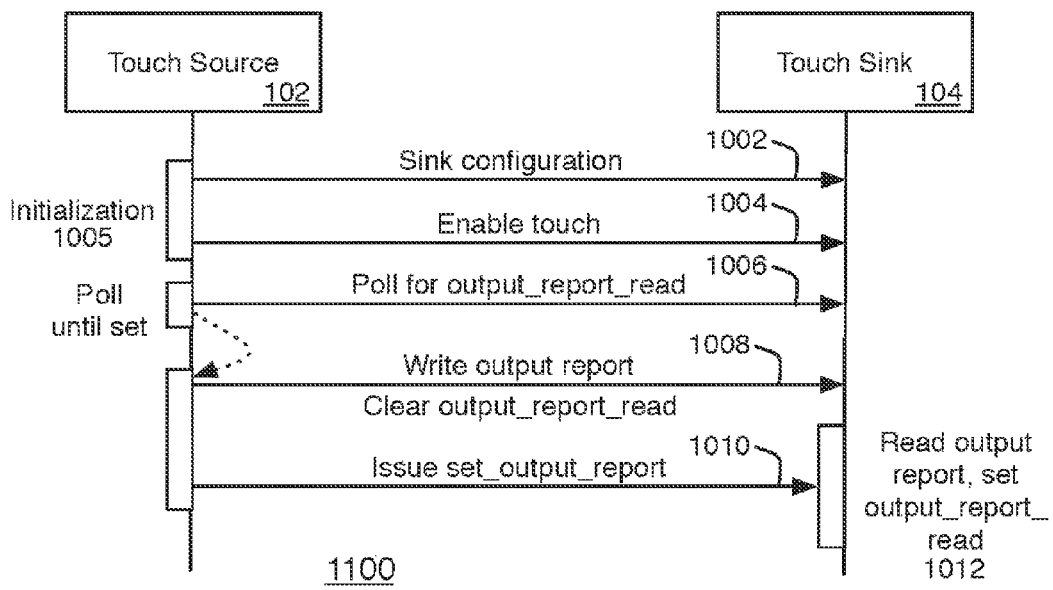

FIG. 10 illustrates a flow diagram of an example process 1000 for output report communication to a touch sink according to various implementations of the present disclosure. FIG. 11 illustrates an example sequence chart 1100 corresponding to process 1000. In various implementations, process 1000 may be used to write output data to the DPCD registers of a touch sink. For example, touch source 102 may implement process 1000 to write an output report to registers 122 of touch sink 104. Process 1000 may include one or more operations, functions or actions as illustrated by one or more of blocks 1002, 1004, 1006, 1008, 1010 and 1012 of FIG. 10. By way of non-limiting example, process 1000 will be described herein with reference to example system 100 of FIG. 1.

Process 1000 may begin at block 1002 where a touch source may configure a touch sink for data access. For example, touch source 102 may configure touch sink 104 for interrupt based data access as described above for block 602 of FIG. 6, or may configure touch sink 104 for polled data access as described above for block 802 of FIG. 8. At block 1004, the touch source may enable a data module in the touch sink as described above with respect to block 604 of FIG. 6 and block 804 of FIG. 8. In various implementations, blocks 1002 and 1004 may be combined into a single initialization operation 1005 that configures a touch sink to provide touch data. For example, touch source 102 may undertake a single write operation over (F)AUX channel 118 to implement operation 1005. In various implementations, a touch source may not perform initialization operation 1005 on each instance of reading a report via process 1000, rather, in such implementations, a touch source may execute the initialization operation only in response to a change in current touch sink configuration (e.g., a change in the configuration of system 100).

Upon availability of output data to be communicated to the touch sink, the touch source may check for any output report read requests at block 1006. For example, touch source 102 may determine whether a previous output report was completed by checking for a SET_OUTPUT_REPORT to be set to 0 by, in the case of polled access, polling for the OUTPUT_REPORT_READ bit to be set in the TOUCH_STATUS_DPCD register, or, in the case of interrupt based access, fielding an IRQ_HPD with TOUCH_INTERRUPT bit and OUTPUT_REPORT_READ bits set. Once a touch source determines that a previous output report, if any, was completed, the touch source may write a next output report and clear the output report read request at block 808. For example, touch source 102 may write the output report to its corresponding location in the OUTPUT_REPORT DPCD region, clear the OUTPUT_REPORT_READ bit, and, in the case of interrupt based access, clear the TOUCH_INTERRUPT bit. At block 1010, the touch source may issue a set output report event. For example, touch source 102 may set the SET_OUTPUT_REPORT bit in the CONFIGURE_TOUCH DPCD register.

Process 1000 may continue at block 1012 where the touch sink may read the output report and set an output report read request. For example, when touch sink 104 detects (e.g., via touch sink firmware) that the SET_OUTPUT_REPORT bit has a value of one (and, in case of interrupt based access, that the TOUCH_INTERRUPT is clear), touch sink 104 may read the output report from the OUTPUT_REPORT DPCD region, set the OUTPUT_REPORT_READ bit, and, in the case of interrupt based access, set the TOUCH_INTERRUPT bit, and clear the SET_OUTPUT_REPORT bit. In various implementations, the OUTPUT_REPORT_SET bit may trigger an interrupt in a touch sink, or touch sink firmware may poll for this bit occasionally.

In various implementations, a touch source may configure a touch sink for feature report communication in a manner similar to that depicted in FIG. 10 for output report communication except that a touch source may set (and a touch sink may clear) the SET_FEATURE_REPORT bit rather than the SET_OUTPUT_REPORT bit in the CONFIGURE_TOUCH DPCD register, read and write rates may be controlled using the FEATURE_REPORT_READ bit rather than the OUTPUT_REPORT_READ bit, the Feature Report may be made available in the REPORT_DATA DPCD region at offset 0, and the Report ID for which the Feature Report is being set may be communicated in TOUCH_PARAMETERS[0] DPCD register. In various implementations, because the TOUCH_PARAMETERS[0] DPCD register may also be used by the GET_FEATURE_REPORT command, a touch source may need to ensure that any previous command has completed using the indications previously described.

Figure 12:
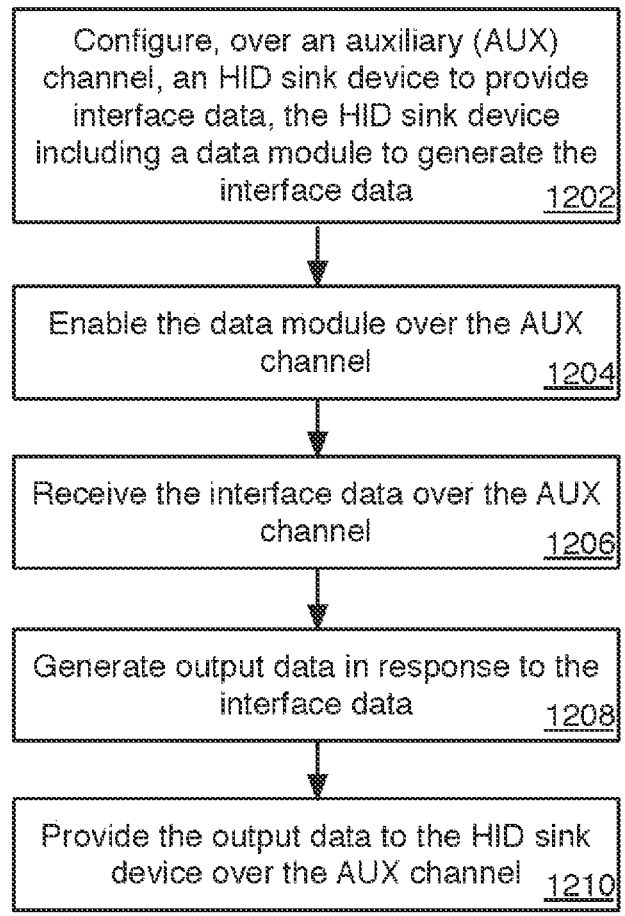

FIG. 12 illustrates a flow diagram of an example process 1200 according to various implementations of the present disclosure. Process 1200 may include one or more operations, functions or actions as illustrated by one or more of blocks 1202, 1204, 1206, 1208 and 1210 of FIG. 12. By way of non-limiting example, process 1200 will be described herein with reference to example system 100 and example processes 600, 800 and 1000 as described previously above.

Process 1200 may begin at block 1202 where an HID sink device may be configured, over an auxiliary (AUX) channel, to provide interface data, where the HID sink device includes a data module to generate the interface data. In various implementations, referring to system 100, block 1202 may involve touch source 102 configuring touch sink 104 over (F)AUX channel 118 to provide interface data, in the form of multi-touch data. For example, touch source 102 may undertake block 1202 in a similar manner to that described above at block 602 of process 600.

Process 1200 may continue at block 1204 where the data module may be enabled over the AUX channel. In various implementations, block 1204 may involve touch source 102 enabling data module 124 of touch sink 104 over (F)AUX channel 118. For example, touch source 102 may undertake block 1204 in a similar manner to that described above at block 604 of process 600.

At block 1206, the interface data may be received over the AUX channel. In various implementations, block 1206 may involve touch source 102 receiving multi-touch data from touch sink 104 over (F)AUX channel 118. For example, touch source 102 may undertake block 1206 in a similar manner to that described above at blocks 606-612 of process 600 or blocks 806-812 of process 800.

Process 1200 may then conclude at blocks 1208 and 1210 where output data may be generated in response to the interface data (block 1208) and the output data may be provided to the HID sink device over the AUX channel (block 1210). In various implementations, blocks 1208 and 1210 may involve touch source 102 using the multi-touch data received at block 1206 to generate output data and then providing the output data to touch sink 104 over (F)AUX channel 118. For example, touch source 102 may undertake block 1208 in a similar manner to that described above at blocks 1006-1012 of process 1000.

Report Freshness

In accordance with the present disclosure, interaction between touch source and touch sink devices for feature reports and/or output reports may be throttled in both devices using the report availability flags. Input reports may be generated at the configured idle rate. In cases where a read rate of a touch source is slower than the rate at which a touch sink generates input reports, the input reports may be queued, and made available to a touch source in order as described previously. In some circumstances, a touch sink's buffer may overflow. If this occurs, a touch sink may, for example, set a BUFFER_OVERFLOWED bit in the TOUCH_STATUS register and assert IRQ_HPD. In response, a touch source may take implementation specific action based on this indication including, for example, lowering the idle rate in the touch sink.

In various implementations, touch sinks may be required to provide a queue depth of at least four maximum-sized (as described in the Report Descriptor) input reports. Further, in various implementations, a touch source may optionally choose to make use of the buffering mechanisms described herein to improve processing efficiency. For example, in various implementations, a sink device may, using the buffering and interrupt mechanisms described herein, have data available and ready for processing by a source device but the source device may optionally process the data at a slower rate by, for example, batch processing the data. For instance, a touch sink may collect touch data at a rate of 50 hertz while a touch source may batch process the touch data in two set batches at a rate of 25 hertz, or in four set batches at a rate of 12.5 hertz, and so forth.

Sideband Messages

Branch devices, such as branch device 202 of FIG. 2, that are in the path between a touch source and a touch sink should be configured in accordance with the DP 1.2 standard. In systems such as system 200 of FIG. 2, touch source 102 may access DPCD registers in touch sink 104 using REMOTE_DPCD_READ and REMOTE_DPCD_WRITE sideband messages. Further, touch sink 104 may indicate touch interrupts using SINK_EVENT_NOTIFY, which may be an upward-going Broadcast Message Transaction having Sink Event as a parameter in the message, and using the TOUCH_INTERRUPT as Bit 7 of the SINK_Event.

Changes to DPCD Address Space

In accordance with the present disclosure, various changes to DPCD address space may be implemented as set forth in Table 3:

TABLE 3

DPCD Address Space Changes

| DP Address | Definition | Read/Write over (F)AUX channel |
|---|---|---|
| Link/Sink Status Field, ESI Field ||| 
| 00201h, 002003h | DEVICE_SERVICE_IRQ_VECTOR Bit7 = TOUCH_INTERRUPT When this bit is set to 1, the Source device may read the REPORT_DATA DPCD registers to process touch data | Clearable Read Only. |
| 02010h-5FFFFh | RESERVED | Read all 0s |
| Touch Field ||| 
| 60000h | TOUCH_CAPABILITY Bit 0 = TOUCH_SUPPORTED 1: Sink supports touch 0: Sink does not support touch Bits 5:1 = MIN_IDLE_RATE Min idle time needed between two scans. Value in milliseconds. Shall be less than or equal to 20 milliseconds. Bits 7:6 = RESERVED | Read Only |
| 60001h | TOUCH_STATUS Value at reset = 0Ch Bit 0 = INPUT_REPORT_AVAILABLE 1: Input Report is available in REPORT_DATA DPCD registers 0: Input Report is not yet available Bit 1 = FEATURE_REPORT_AVAILABLE | Clearable Read Only |

TABLE 3-continued

DPCD Address Changes

| DP Address | Definition | Read/Write over (F)AUX channel |
|---|---|---|
| | 1: Feature Report is available in REPORT_DATA DPCD registers<br>0: Feature Report is not yet available<br>Bit 2 = OUTPUT_REPORT_READ<br>1: Output Report has been read by the Touch Sink<br>0: Output. Report has not been read yet<br>Bit 3 = FEATURE_REPORT_READ<br>1: Feature Report has been read by the Touch Sink<br>0: Feature Report has not been read yet<br>Bit 4 = BUFFER_OVERFLOW_ERROR<br>1: Buffer for Input Reports has overflown in the Touch Sink<br>0: No error<br>Bits 7:5 = RESERVED | |
| 60002h-60005h | COMMAND_PARAMETERS<br>These four bytes may be interpreted in a command-specific manner. The commands may be issued in the CONFIGURE_TOUCH DPCD register. | Write Only |
| 60006h | CONFIGURE_TOUCH<br>Default = 0xxxxxxx0b i.e., touch functionality is disabled at reset and on unplug.<br>Bit 0 = ENABLE_TOUCH<br>1: Enable touch feature on the Sink<br>0: Disable touch feature on the Sink. If disabled, Source treats data in TOUCH_DATA DPCD registers as invalid<br>Bit 1 = DATA_ACCESS_METHOD<br>1: Interrupt based<br>0: Polled (i,e., interrupts disabled)<br>Bit 2 = RESET<br>1: Reset touch device/re-initialize firmware<br>0: No device action needed<br>Bit 3 = GET_FEATURE_REPORT<br>1: Feature Report requested by Touch Source. Report ID for this request is in TOUCH_PARAMETERS[0]DPCD register<br>0: No device action needed<br>Bit 3 = SET_FEATURE_REPORT<br>1: Feature report available at offset 0 in REPORT_DATA DPCD region. Size of the Feature Report is determined by the Report ID (in TOUCH_PARAMETERS[0]) and information parsed from the HID Descriptor<br>0: No device action needed<br>Bit 4 = SET_OUTPUT_REPORT<br>1: Output Report available in OUTPUT_REPORT DPCD region<br>0: No device action needed<br>Bit 5 = SET_IDLE_RATE<br>1: Touch Sink is to originate Input Reports for the Report IDs as per the rate specified in the IDLE_RATES DPCD region<br>0: No device action needed<br>Bit 6 = SET_LOW_POWER<br>This command is used to put the touch feature in a low power state.<br>1: Sleep<br>0: ON<br>Bits 7 = RESERVED | Clearable Write Only |
| 60007h | RESERVED | Read all 0s |
| 60008h-60017h | IDLE_RATES<br>This DPCD region (15 bytes) contains the idle rates for a maximum of 15 Input Report IDs. The rate for Report ID 1 starts at offset 0, is specified in milliseconds, and has as maximum value of 20.<br>The rate for Report ID 2 starts at offset 2, immediately following Report ID 1. The value is interpreted similar to that for Report ID 1. Similarly for all other Report IDs. | Read Write |
| | The number of valid entries in this table is 2 * number of valid Input Report IDs, as parsed from the HID Descriptor. | |
| 60018h-6003Fh | Reserved for touch usage | Read all 0s |
| 60040h-6103Fh | HID_CLASS_DESCRIPTORS (HID and Report) and optional (Physical and vendor specific) descriptors from the Sink device | Read Only |
| 61040h-6143Fh | REPORT_DATA<br>This 1K DPCD region contains the Input Report and (if declared in the HID Descriptor) Feature Report. | Read Only |
| 61440h-6183Fh | OUTPUT REPORT<br>This 1K DPCD region contains (if declared in the HID Descriptor) the Output Report Feature Report. | Write Only |
| 61840h-61CFFh | Reserved for future touch/HID usage | Read all 0s |

Example DP Touch Implementation

In accordance with the present disclosure, an HID device that supports "multi-input" mode operation (e.g., a touch source or touch sink device) may implement a touch interface that defines two reports, a device configuration feature report and an input report. In various implementations, a feature report may identify the mode that a digitizer is operating in (Digitizer:Device Mode) and a maximum number of simultaneous contacts/touches that are supported by the interface (Digitizer:Contact Count Maximum). In various implementations, software may read a feature report when a device is discovered. In various implementations, a touch report may include a Digitizer:Contact Count field and an array of contact information fields where the Digitizer:Contact Count Maximum field in the Feature report identifies the size of the contact information array. The Digitizer:Contact Count field may identify the number of entries in the contact information array that are currently valid (e.g., if only four fingers are detected, then Contact Count=four and the first four entries (0-3) in the contact information array are valid).

In various implementations, an HID Descriptor may be nine bytes in size (USBHIDDescriptor.bLength=9) and may start at offset 0 in the HID_CLASS_DESCRIPTORS DPCD registers. For example, an HID Descriptor may be formatted as follows:

```
USB_HID_DESCRIPTOR USBHIDDescriptor[ ] = {
0x09,    // bLength
0x21,    // bDescriptorType
0x0100,  //bcdHID
0x21,    // bCountryCode
0x01,    // bNumDescriptors
0x22,    // cd[0].bDescriptorType
0x0156   // cd[0].wDescriptorLength
};
```

In various implementations, a Report Descriptor may be 342 bytes in size (USBHIDDescriptor.ed[0].wDescriptorLength=0x156) and may start at offset 10 (USBHIDDescriptor.bLength+1) in the HID_DESCRIPTOR area. If another HID class descriptor was defined in the HID Descriptor, then it would start at end of the Report Descriptor (i.e. offset 352, or 10+342). For example, an Report Descriptor may be formatted as follows:

```
char ReportDescriptor[342] = {
0x05, 0x0d,         // USAGE_PAGE (Digitizers)
0x09, 0x04,         // USAGE (Touch Screen)
0xa1, 0x01,         // COLLECTION (Application)
0x09, 0x0e,         //   USAGE (Device Configurailon) ; Device Configutalion Report
0xa1, 0x02,         //   COLLECTION (Logical) ; Report ID = 1
0x15, 0x00,         //     LOGICAL_MINIMUM (0)
0x25, 0x0f,         //     LOGICAL_MAXIMUM (15)
0x75, 0x04,         //     REPORT_SIZE (4)
0x95, 0x02,         //     REPORT_COUNT (2)
0x09, 0x52,         //     USAGE (Device Mode)
0x09, 0x55,         //     USAGE (Contact Count Maximum)
0xb1, 0x02,         //     FEATURE (Data,Var,Abs)
0xc0,               //   END_COLLECTION
0x09, 0x33          //   USAGE (Touch) ;       Touch Report for up to 10 fingers
0xa1, 0x02,         //   COLLECTION (Logical) ; Report ID = 1
0x75, 0x08,         //     REPORT_SIZE (8)
0x15, 0x01,         //     LOGICAL_MINIMUM (1)
0x25, 0x0a,         //     LOGICAL_MAXIMUM (10)
0x09, 0x54,         //     USAGE (Contact Count)
0x81, 0x02,         //     INPUT (Data,Var,Abs) ; Contact Count = 1-10
0x09, 0x22,         //     USAGE (Finger)
0xa1, 0x00,         //     COLLECTION (Physical)
0x15, 0x00,         //       LOGICAL_MINIMUM (0)
0x26, 0xff, 0x00,   //       LOGICAL_MAXIMUM (255)
0x09, 0x51,         //       USAGE (Cantact Identifier)
0x75, 0x08,         //       REPORT_SIZE (8)
0x81, 0x02,         //       INPUT (Data,Var,Abs) ; Contact 0 Identifier
0x26, 0xff, 0x0f,   //       LOGICAL_MAXIMUM (4095)
0x75, 0x0c,         //       REPORT_SIZE (12)
0x05, 0x01,         //       USAGE_PAGE (Generic Desktop)
0x09, 0x30,         //       USAGE (X)
0x81, 0x02,         //       INPUT (Data,Var,Abs)
0x09, 0x31,         //       USAGE (Y)
0x81, 0x02,         //     INPUT (Data,Var,Abs)
0xc0,               //     END_COLLECTION
0x09, 0x22,         //     USAGE (finger)
0xa1, 0x00,         //     COLLECTION (Physical)
0x26, 0xff, 0x00,   //       LOGICAL_MAXIMUM (255)
0x0b, 0x51, 0x00, 0x0d, 0x00, //   USAGE (Digitizers:Contact Identifier)
0x75, 0x08,         //       REPORT_SIZE (8)
0x81, 0x02,         //       INPUT (Data,Var,Abs) ; Contact ID 1
0x26, 0xff, 0x0f,   //       LOGICAL_MAXIMUM (4095)
0x75; 0x0c,         //       REPORT_SIZE (12)
0x09, 0x30,         //       USAGE (X)
0x81, 0x02,         //       INPUT (Data,Var,Abs)
0x09, 0x31,         //       USAGE (Y)
0x81, 0x02,         //       INPUT (Data,Var,Abs)
0xc0,               //     END_COLLECTION
0x09, 0x22,         //     USAGE (Finger)
0xa1, 0x00,         //     COLLECTION (Physical)
0x26, 0xff; 0x00,   //       LOGICAL_MAXIMUM (255)
0x0b, 0x51, 0x00, 0x0d, 0x00, //   USAGE (Digitizers:Contact Identifier)
0x75, 0x08,         //       REPORT_SIZE (8)
0x81, 0x02,         //       INPUT (Data,Var,Abs) ; Contact ID 2
0x26, 0xff, 0x0f    //       LOGICAL_MAXIMUM (4095)
0x75, 0x0c,         //       REPORT_SIZE (12)
0x09, 0x30,         //       USAGE (X)
0x81, 0x02,         //       INPUT (Data,Var,Abs)
0x09, 0x31,         //       USAGE (Y)
0x81, 0x02,         //       INPUT (Data,Var,Abs)
0xc0,               //     END_COLLECTION
0x09, 0x22,         //     USAGE (Finger)
0xa1, 0x00,         //     COLLECTION (Physical)
0x26, 0xff, 0x00,   //     LOGICAL_MAXIMUM (255)
0x0b, 0x51, 0x00, 0x0d, 0x00, //   USAGE (Digitizers:Contact Identifier)
0x75, 0x08,         //       REPORT_SIZE (8)
0x81, 0x02,         //       INPUT (Data,Var,Abs) ; Contact ID 3
0x26, 0xff, 0x0f,   //       LOGICAL_MAXIMUM (4095)
0x75, 0x0c,         //       REPORT_SIZE (12)
0x09, 0x30,         //       USAGE (X)
0x81, 0x02,         //       INPUT (Data,Var,Abs)
0x09, 0x31,         //       USAGE (Y)
0x81, 0x02,         //       INPUT (Data,Var,Abs)
0xc0,               //     END_COLLECTION
0x09, 0x22,         //     USAGE (Finger)
0xa1, 0x00,         //     COLLECTION (Physical)
0x26, 0xff, 0x00,   //       LOGICAL_MAXIMUM (255)
0x0b, 0x51, 0x00, 0x0d, 0x00, //   USAGE (Digitizers:Contact Identifier)
0x75, 0x08,         //       REPORT_SIZE (8)
0x81, 0x02,         //       INPUT (Data,Var,Abs) ; Contact ID 4
```

-continued

```
0x26, 0xff, 0x0f,       //    LOGICAL_MAXIMUM (4095)
0x75, 0x0c,             //    REPORT_SIZE (12)
0x09, 0x30,             //    USAGE (X)
0x81, 0x02,             //    INPUT (Data,Var,Abs)
0x09, 0x31,             //    USAGE (Y)
0x81, 0x02,             //    INPUT (Data,Var,Abs)
0xc0,                   //   END_COLLECTION
0x09, 0x22,             //   USAGE (Finger)
0xa1, 0x00,             //   COLLECTION (Physical)
0x26, 0xff, 0x00,       //    LOGICAL_MAXIMUM (255)
0x0b, 0x51, 0x00, 0x0d, 0x00, //    USAGE (Digitizers:Contact Identifier)
0x75, 0x08,             //    REPORT_SIZE (8)
0x81, 0x02,             //    INPUT (Data,Var,Abs) ; Contact ID 5
0x26, 0xff, 0x0f,       //    LOGICAL_MAXIMUM (4095)
0x75, 0x0c,             //    REPORT_SIZE (12)
0x09, 0x30,             //    USAGE (X)
0x81, 0x02,             //    INPUT (Data,Var,Abs)
0x09, 0x31,             //    USAGE (Y)
0x81, 0x02,             //    INPUT (Data,Var,Abs)
0xc0,                   //   END_COLLECTION
0x09, 0x22,             //   USAGE (Finger)
0xa1, 0x00,             //   COLLECTION (Physical)
0x26, 0xff, 0x00,       //    LOGICAL_MAXIMUM (255)
0x0b, 0x51, 0x00, 0x0d, 0x00, //    USAGE (Digitizers:Contact Identifier)
0x75, 0x08,             //    REPORT_SIZE (8)
0x81, 0x02,             //    INPUT (Data,Var,Abs) ; Contact ID 6
0x26, 0xff, 0x0f,       //    LOGICAL_MAXIMUM (4095)
0x75, 0x0c,             //    REPORT_SIZE (12)
0x09, 0x30,             //    USAGE (X)
0x81, 0x02,             //    INPUT (Data,Var,Abs)
0x09, 0x31,             //    USAGE (Y)
0x81, 0x02,             //    INPUT (Data,Var,Abs)
0xc0,                   //   END_COLLECTION
0x09, 0x22,             //   USAGE (Finger)
0xa1, 0x00,             //   COLLECTION (Physical)
0x26, 0xff, 0x00,       //    LOGICAL_MAXIMUM (255)
0x0b, 0x51, 0x00, 0x0d, 0x00, //    USAGE (Digitizers:Contact Identifier)
0x75, 0x08,             //    REPORT_SIZE (8)
0x81, 0x02,             //    INPUT (Data,Var,Abs) ; Contact ID 7
0x26, 0xff, 0x0f,       //    LOGICAL_MAXIMUM (4095)
0x75, 0x0c,             //    REPORT_SIZE (12)
0x09, 0x30,             //    USAGE (X)
0x81, 0x02,             //    INPUT (Data,Var,Abs)
0x09, 0x31,             //    USAGE (Y)
0x81, 0x02,             //    INPUT (Data,Var,Abs)
0xc0,                   //   END_COLLECTION
0x09, 0x22,             //   USAGE (Finger)
0xa1, 0x00,             //   COLLECTION (Physical)
0x26, 0xff, 0x00,       //    LOGICAL_MAXIMUM (255)
0x0b, 0x51, 0x00, 0x0d, 0x00, //    USAGE (Digitizers:Contact Identifier)
0x75, 0x08,             //    REPORT_SIZE (8)
0x81, 0x02,             //    INPUT (Data,Var,Abs) ; Contact ID 8
0x26, 0xff, 0x0f,       //    LOGICAL_MAXIMUM (4095)
0x05, 0x01,             //    USAGE_PAGE (Generic Desktop)
0x09, 0x30,             //    USAGE (X)
0x81, 0x02,             //    INPUT (Data,Var,Abs)
0x09, 0x31,             //    USAGE (Y)
0x81, 0x02,             //    INPUT (Data,Var,Abs)
0xc0,                   //   END_COLLECTION
0x09, 0x22,             //   USAGE (Finger)
0xa1, 0x00,             //   COLLECTION (Physical)
0x26, 0xff, 0x00,       //    LOGICAL_MAXIMUM (255)
0x0b, 0x51, 0x00, 0x0d; 0x00, //    USAGE (Digitizers:Contact Identifier)
0x05, 0x08,             //    REPORT_SIZE (8)
0x81, 0x02,             //    INPUT (Data,Var,Abs) ; Contact ID 9
0x26, 0xff, 0x0f,       //    LOGICAL_MAXIMUM (4095)
0x75, 0x0c,             //    REPORT_SIZE (12)
0x09, 0x30,             //    USAGE (X)
0x81, 0x02,             //    INPUT (Data,Var,Abs)
0x09, 0x31,             //    USAGE (Y)
0x81, 0x02,             //    INPUT (Data,Var,Abs)
0xc0,                   //   END_COLLECTION
0xc0,                   //  END_COLLECTION
0xc0                    // END_COLLECTION
```

Report Data Layout

Figure 13:
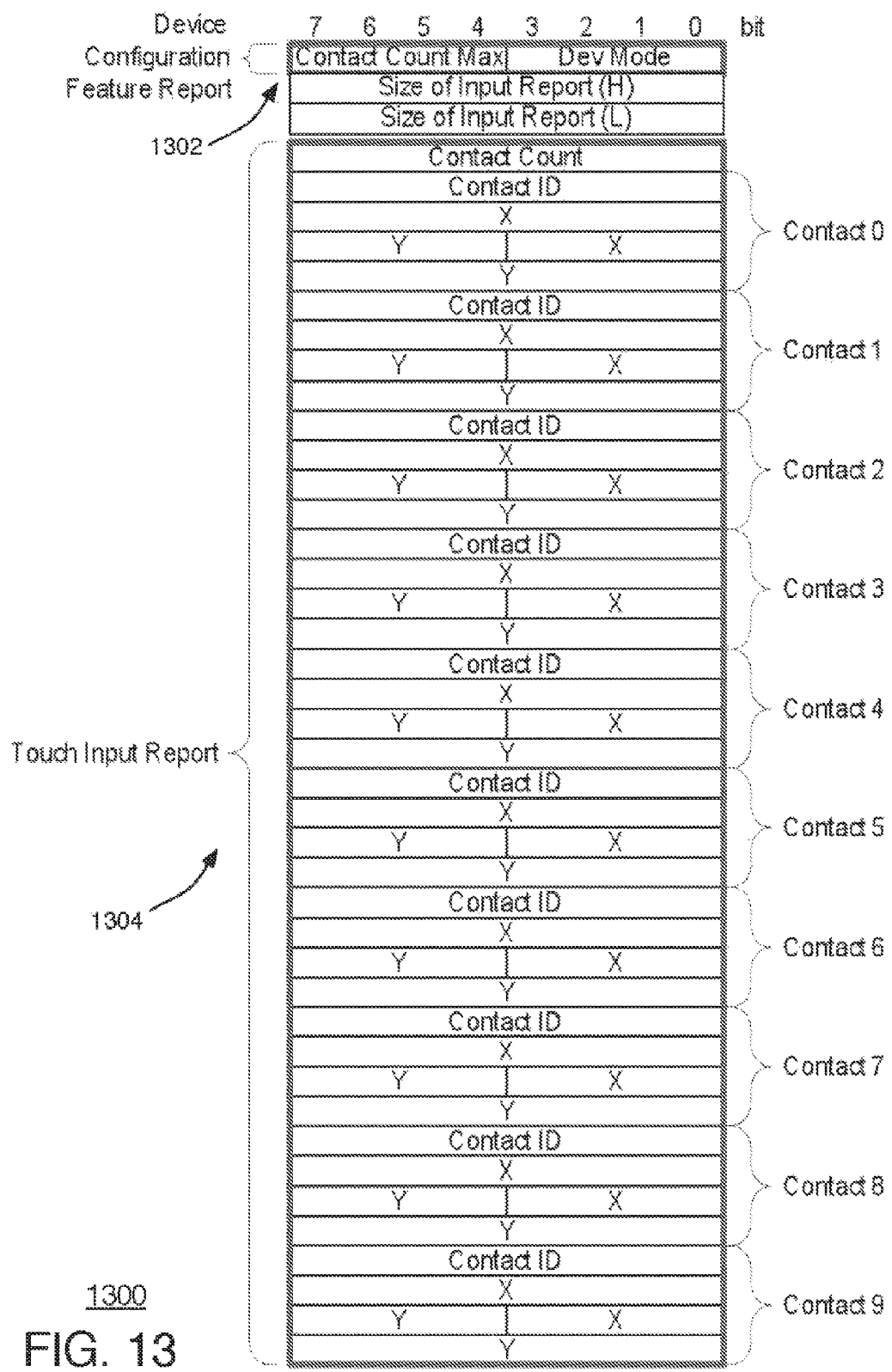
FIG. 13 is an illustrative diagram of an example data scheme.

FIG. 13 illustrates the layout 1300 of the REPORT_DATA area as defined by the Report Descriptor described above. In various implementations, the feature report may be allocated before the input report. As shown in FIG. 13, layout 1300 includes a feature report 1302 having a single byte defining two fields: Device Mode and Contact Count Maximum. A touch input report 1304 immediately follows the feature report and the Input Report Size fields. The input report may be thirty-one bytes in size, and may include a one byte Contact Count field followed by an array of ten, three byte Contact entries. Each Contact entry may consist of an 8-bit Contact ID followed by a 12-bit X and a 12-bit Y field. The Contact Count identifies how many Contact entries are currently valid. For example, if Contact Count=4, then Contact entries 0-3 are valid. While the Report Descriptor may define the feature report 1302 before the input report 1304, as shown in layout 1300, the reports may be defined in the reverse order in the Report Descriptor and still be presented in the REPORT_DATA area with the feature report 1302 occurring first.

While implementation of example processes 600, 800, 1000 and 1200 as illustrated in FIGS. 6, 8, 10 and 12 may include the undertaking of all blocks shown in the order illustrated, the present disclosure is not limited in this regard and, in various examples, implementation of processes 600, 800, 1000 and 1200 may include the undertaking only a subset of the blocks shown and/or in a different order than illustrated.

In addition, any one or more of the blocks of 6, 8, 10 and 12 may be undertaken in response to instructions provided by one or more computer program products. Such program products may include signal bearing media providing instructions that, when executed by, for example, a processor, may provide the functionality described herein. The computer program products may be provided in any form of computer readable medium, Thus, for example, a processor including one or more processor core(s) may undertake one or more of the blocks shown in FIGS. 6, 8, 10 and 12 in response to instructions conveyed to the processor by a computer readable medium.

As used in any implementation, described herein, the terms "module" and/or "logic" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules and/or logic may, collectively or individually, be embodied as circuitry that forms part of a larger system, for example, an integrated circuit (IC), system on-chip (SoC), and so forth.

Figure 14:
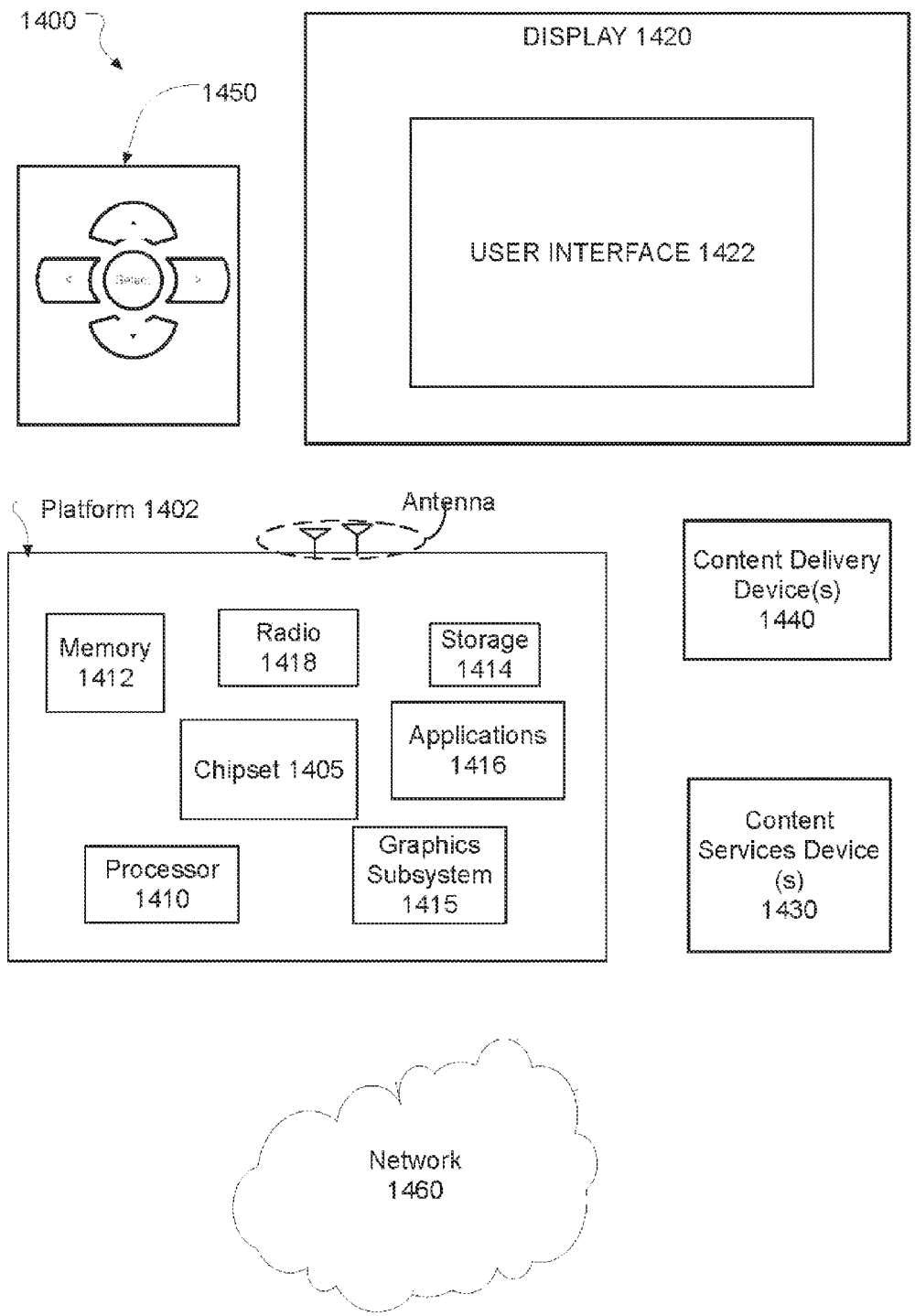
FIG. 14 is an illustrative diagram of an example system.

FIG. 14 illustrates an example system 1400 in accordance with the present disclosure. In various implementations, system 1400 may be a media system although system 1400 is not limited to this context. For example, system 1400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1410 may be dual-core processors), dual-core mobile processors), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, DisplayPort, wireless HDMI, and/or wireless HD compliant techniques. Graphics subsystem 1415 may be integrated into processor 1410 or chipset 1405. In some implementations, graphics subsystem 1415 may be a stand-alone card communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In a further embodiments, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented, reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and or content, and any other similar device capable of unidirectionally or bidirectionally communicating content between content providers and platform 1402 and/display 1420, via network 1460 or directly. It will be appreciated that the content may be communicated unidirectionally and/or bidirectionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of controller 1450 may be used to interact with user interface 1422, for example. In embodiments, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In embodiments, controller 1450 may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content service's device(s) 1430 or content delivery device(s) 1440 even when the platform is turned "off." In addition, chipset 1405 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(a) 1440 may be integrated, or platform 1402, content services device(s) 1430, and content delivery device(s) 1440 may be integrated, for example. In various embodiments, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various embodiments, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired-system, system 1400 may include components and interfaces suitable for communicating over wired communications: media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control, information may be used to route media information through a system, or instruct a node to process the media information in a predetermined manner. The embodiments, however, are not limited to the elements or in the context shown or described in FIG. 14.

Figure 15:
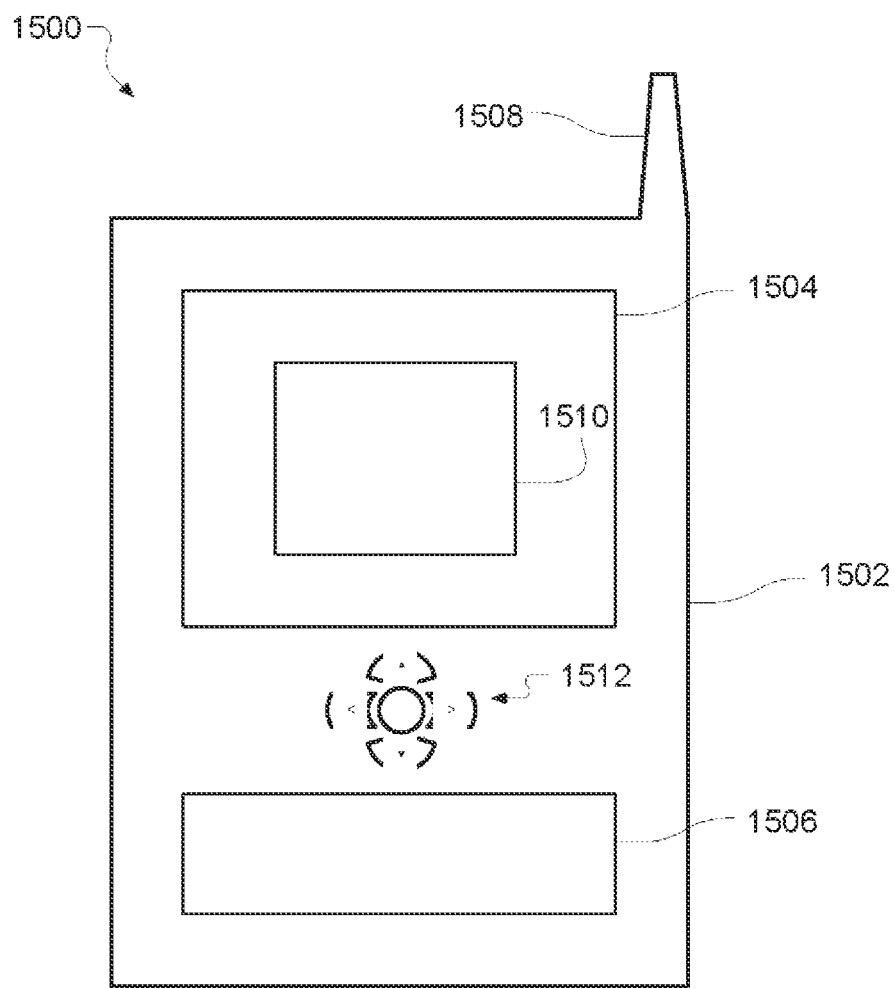
FIG. 15 is an illustrative diagram of an example device, all arranged in accordance with at least some implementations of the present disclosure.

As described above, system 1400 may be embodied in varying physical styles or form factors. FIG. 15 illustrates implementations of a small form factor device 1500 in which system 1400 may be embodied. In embodiments, for example, device 1500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1500 may include a housing 1502, a display 1504, an input/output (I/O) device 1506, and an antenna 1508. Device 1500 also may include navigation features 1512. Display 1504 may include any suitable display unit for displaying information appropriate for a mobile computing device. I/O device 1506 may include any suitable I/O device for entering information into a mobile computing device. Examples for I/O device 1506 may include an alphanumeric keyboard, a numeric keypad, a touch pad, input keys, buttons, switches, rocker switches, microphones, speakers, voice recognition device and software, and so forth. Information also may be entered into device 1500 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A method, comprising:
 at a Human Interface Device (HID) source device:
 configuring, over an auxiliary (AUX) channel, an HID sink device to provide interface data, the HID sink device including a data module to generate the interface data;
 enabling the data module over the AUX channel; and
 receiving the interface data over the AUX channel comprising:
 at the HID source device:
 reading an interrupt reason;
 reading the interface data in response to reading the interrupt reason; and
 clearing the interrupt reason.

2. The method of claim 1, wherein the interface data comprises multi-touch data.

3. The method of claim 1, wherein the AUX channel comprises a fast auxiliary (F)AUX channel.

4. The method of claim 1, wherein configuring the HID sink device to provide interface data comprises configuring a data access method.

5. The method of claim 1, wherein configuring the HID sink device to provide interface data and enabling the data module comprises a single write operation.

6. The method of claim 1, wherein receiving the interface data comprises obtaining the interface data from at least one register of the HID sink device.

7. A method, comprising:
 at a Human Interface Device (HID) source device:
 configuring, over an auxiliary (AUX) channel, an HID sink device to provide interface data, the HID sink device including a data module to generate the interface data;
 enabling the data module over the AUX channel; and
 receiving the interface data over the AUX channel comprising:
 at the HID source device:
 requesting a report;
 polling for a report availability flag;
 reading the interface data in response to detecting the report availability flag; and
 clearing the report availability flag.

8. A non-transitory computer readable medium comprising a computer program product having stored therein instructions that, if executed by a computing device, result in:
 at a Human Interface Device (HID) source device:
 configuring, over an auxiliary (AUX) channel, a HID sink device to provide interface data, the HID sink device including a data module to generate the interface data;
 enabling the data module over the AUX channel; and receiving the interface data over the AUX channel comprising:
   at the HID source device:
      reading an interrupt reason;
      reading the interface data in response to reading the interrupt reason; and
      clearing the interrupt reason.

9. The medium of claim 8, further comprising, at the HID source device:
   generating output data in response to the interface data; and
   providing the output data to the HID sink device.

10. The medium of claim 8, wherein configuring the HID sink device to provide multi-touch data comprises configuring a data access method.

11. The medium of claim 10, wherein the data access method comprises at least one of an interrupt based data access method, a polled data access method, or an interleaved data access method.

12. The medium of claim 8, wherein configuring the HID sink device to provide interface data and enabling the data module comprises a single write operation.

13. The of claim 8, wherein receiving the interface data further comprises:
   at the HID source device:
      requesting a report;
      polling for a report availability flag;
      reading the interface data in response to detecting the report availability flag; and
      clearing the report availability flag.

14. A system comprising:
   a Human Interface Device (HID) sink device including a data module to capture interface data; and
   a HID source device communicatively coupled to the HID sink device by an auxiliary (AUX) channel,
   wherein the HID source device is to use the AUX channel to:
      configure the HID sink device to provide the interface data;
      enable the data module; and
      receive the interface data;
   wherein to configure the HID sink device to provide interface data the HID source device is to configure a data access method comprising a polled data access method, the HID source device is to:
      request a report;
      poll for a report availability flag;
      read the interface data in response to detecting the report availability flag; and
      clear the report availability flag.

15. The system of claim 14, wherein the HID sink device further comprises a plurality of register regions.

16. The system of claim 15, wherein logic is to provide the interface data by storing the interface data in the at least one of the plurality of register regions.

17. The system of claim 15, wherein logic is to signal the availability of the interface data using the flag by setting a bit in at least one of the plurality of register regions.

18. The system of claim 14, the HID source device further to:
   generate output data in response to the interface data; and
   provide the output data to the HID sink device over the AUX channel.

19. The system of claim 14, wherein further to receive the interface data using an interrupt based data access method the HID source device is to:
   read an interrupt reason;
   read the interface data in response to reading the interrupt reason; and
   clear the interrupt reason.

\* \* \* \* \*